F. B. DAVIDSON.
PAPER BOARD.
APPLICATION FILED AUG. 9, 1919.

Patented Sept. 21, 1920.

Inventor
Frank B. Davidson
by Eugene Eamann Atty

UNITED STATES PATENT OFFICE.

FRANK B. DAVIDSON, OF MARSEILLES, ILLINOIS, ASSIGNOR TO NATIONAL BISCUIT COMPANY, OF NEW YORK, N. Y., A CORPORATION OF NEW YORK.

PAPER-BOARD.

1,353,323.     Specification of Letters Patent.     Patented Sept. 21, 1920.

Application filed August 9, 1919. Serial No. 316,303.

*To all whom it may concern:*

Be it known that I, FRANK B. DAVIDSON, a citizen of the United States, residing at Marseilles, in the county of La Salle and State of Illinois, have invented new and useful Improvements in Paper-Board, of which the following is a specification.

This invention relates to a built-up sheet of paper-board, comprising a plurality of layers or piles of paper material secured together by separate films or layers of asphaltum or its equivalent and silicate of soda, so that the board possesses moisture-repellent properties and thus may be effectively used for making containers or "caddies" for bakery and other products required to be packed and shipped in moisture-proof packages. Other and further objects of my invention will appear from the following specification, taken in connection with the accompanying drawings, in which—

Figure 3:
Figure 4:
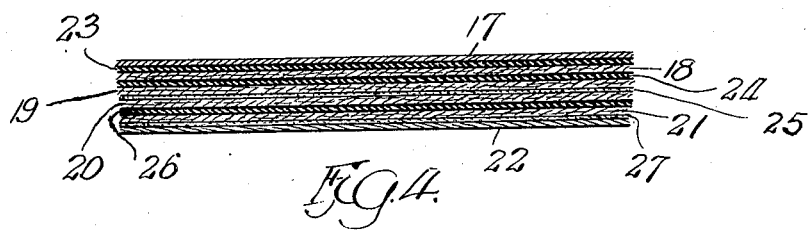

Fig. 3 is an enlarged cross-sectional view of a built-up sheet of paper-board embodying the features of my invention and comprising a greater number of layers or plies of paper material than the board shown in the preceding figures; and Fig. 4 is an enlarged cross-sectional view of a built-up sheet of paper-board embodying the features of my invention, and showing the layers or plies of paper material of the board secured together in a manner somewhat different than shown in Fig. 3.

Figure 1:
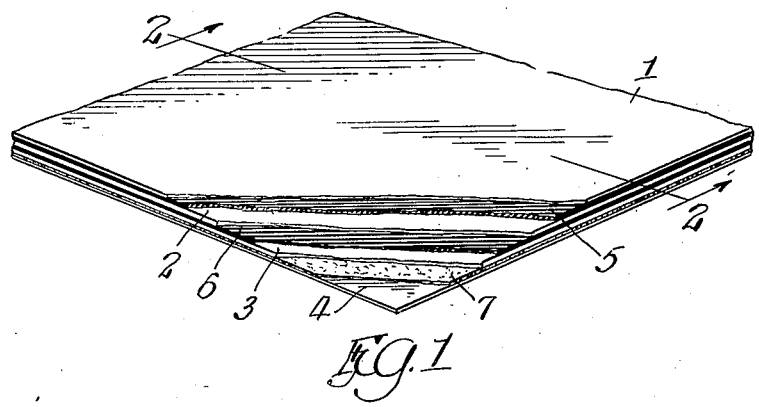
Figure 1 is a perspective view of a built-up sheet of paper-board made in accordance with my invention and having the several layers thereof broken away to indicate how the board is made.
Figure 2:
Fig. 2 is an enlarged cross-sectional view taken on line 2—2 of Fig. 1.

In Figs. 1 and 2 of the drawings, I have shown a built-up sheet of paper-board made in accordance with my invention and comprising four layers or plies of sheet paper material 1, 2, 3, and 4, placed one upon the other and with the layers 1 and 4 forming the outside layers of the board. The layers 2 and 3 are between the layers 1 and 4 and form the intermediate layers of the board. The outside layer 1 is preferably formed of a strong paper sheet, such as Kraft paper, and is the outside wrapper of the box wall made from said built-up board. The next layer 2 is formed of plain paper-board and is secured to the layer 1 by an interposed film or layer 5 of asphaltum or its equivalent, which possesses sufficient adhesive qualities to secure the layers 1 and 2 together. In addition, the asphaltum layer 5 possesses moisture-repellent properties and thus makes a moisture-repellent connection between said layers 1 and 2. The next layer 3 is also made of plain paper-board of a thickness approximately equal to that of the layer 2, and said layers 2 and 3 are secured together by an interposed film or layer 6 of asphaltum or its equivalent and accomplishing the same results as the asphaltum film 5. The next layer 4 is the inside layer of the built-up board and is a sheet of lining paper, and constitutes the liner sheet of the box wall made of said board and against which the products packed in the container are placed. Said layer 4 is secured to the layer 3 by an interposed film 7 of silicate of soda, which has sufficient adhesive properties for that purpose. The built-up paper-board shown and described, by reason of the two films or layers 5 and 6 of asphaltum or its equivalent, possesses such moisture-repellent properties that moisture will not pass through the built-up board from either side thereof, and thus makes an efficient box wall, as it is moisture-proof not only from without but from within, and keeps the products packed in the container fresh and edible when the products are of that nature requiring moisture to be retained in the container. Moreover, when the products packed in the container need to be kept dry and free from moisture, the films or layers 5 and 6 of asphaltum or its equivalent prevent moisture from entering the container and affecting the products packed therein. The built-up paper-board shown in Figs. 1 and 2 is preferably formed on a continuous process machine in the form of a web, by feeding the several layers 1 to 4 of sheet paper material into the machine and applying the layers or films 5 and 6 of asphaltum or its equivalent and the film 7 of silicate of soda between the several layers of sheet paper material in the order shown. The built-up board is fed into a cutting machine for forming the blanks from which the cartons or containers are made. The layers or films 5 and 6 of asphaltum or its equivalent gum up the knife blades as they pass through the same, but as the film 7 of silicate of soda when dry is in a somewhat granular condition and is the film through which the knife blades pass after going through the films or layers of asphaltum or its equivalent, the silicate of soda serves to scour the knife blades and clean them of deposits of asphaltum or other material used in the layers 5 and 6, with the result that the knife blades are maintained in proper condition to cut subsequent blanks out of built-up board fed into the machine.

In Fig. 3, I have shown a built-up sheet of paper-board embodying the features of my invention, but having a greater number of plies or layers of sheet paper material than shown in Figs. 1 and 2. As illustrated in Fig. 3, the board comprises five layers or plies of sheet paper material 8, 9, 10, 11, and 12, the layers 8 and 12 being on the outside of the board. The layer 8 is preferably made of a sheet of Kraft or like paper and constitutes the wrapper of the box wall made from said board. The layer 12 is made of a sheet of liner paper and forms the inner liner of the box wall. The outside layer 8 and the next layer 9 are secured together by an interposed film or layer 13 of asphaltum or its equivalent. The layer 9 is formed of plain paper-board and is secured to the next layer 10 by an interposed film 14 of silicate of soda. The next layer 11 is also made of plain board and has substantially the same thickness as the layers 9 and 10, and is secured to the layer 10 by an interposed film or layer 15 of asphaltum or its equivalent. The layer 11 is secured to the liner sheet 12 by an interposed film 16 of silicate of soda. Thus in the built-up sheet of paper-board shown, there are two films or layers of asphaltum or its equivalent, as in the case of the board shown in Fig. 2, while there are two films of silicate of soda instead of one as in the board shown in Fig. 2. But in each case it will be noted that there is a film of silicate of soda below the lowermost film or layer of asphaltum or its equivalent, so that the knife blades in passing through the last film of silicate of soda will be scoured and cleaned of deposits of asphaltum or the material used for the layers or films 13 and 15.

In Fig. 4, I have shown a built-up sheet of paper-board comprising a greater number of layers or plies of sheet paper material than shown in Fig. 3. In Fig. 4, the board comprises six layers 17, 18, 19, 20, 21, and 22 of sheet paper material. The layers 17 and 22 are on the outsides of the board, the former being the outer wrapper and the latter the liner sheet of the box wall made from said board. The outer sheet 17 and the next sheet 18, which is made of plain paper-board, are secured together by an interposed film or layer 23 of asphaltum or its equivalent. The layers 18 and 19, made of plain paper board are secured together by an interposed film or layer 24 of asphaltum or its equivalent. The layer 20 is also made of plain paper-board and is secured to the layer 19 by an interposed film 25 of silicate of soda. The layer 21, of paper-board, is secured to the layer 20 by an interposed layer or film 26 of asphaltum or its equivalent, while the liner sheet 22 is secured to the layer 21 by an interposed film 27 of silicate of soda. It will be noted that in such built-up board there are three films or layers of asphaltum or its equivalent and two films of silicate of soda, there being a film of silicate of soda below the lowermost film of asphaltum or its equivalent, so that the knife blades will be secured and cleaned of any deposits of such material.

A built-up sheet of paper-board, whether made of a plurality of layers or plies of paper material as shown in Figs. 2, 3, and 4, all have at least one layer or film of asphaltum or its equivalent interposed between two of the paper layers of the board and at least one film of silicate of soda on that side of the layer or film of asphaltum or its equivalent through which the knife blades of the blanking machine pass last in cutting the board into blanks for boxes or other articles. Manifestly, no matter how many layers or films of asphaltum or its equivalent are used in the built-up sheet of paper-board, there is a film of silicate of soda below the layers or films of asphaltum or the like for scouring and cleaning the knife blades of such material. A container made of a built-up sheet of paper-board embodying the features of my invention and used for containing bakery products will maintain such products always ready for use and such products will not spoil or become dry during the time that the container is in transportation and remains unopened after reaching the retail grocer.

Paper-board made as described is also suitable for containers of merchandise other than bakery products, as well as for other uses, such as wall-boards and the like, where a board of moisture-repellent qualities is required.

I claim as my invention:

1. A built-up sheet of paper-board, comprising a plurality of plies of paper material, at least two of which are secured together by an interposed layer of asphaltum or its equivalent, and another of said plies of paper material being secured to the adjacent ply by an interposed film of silicate of soda.

2. A built-up sheet of paper-board, comprising a plurality of plies of paper material, at least two of which are secured together by an interposed layer of asphaltum or its equivalent, and a ply of paper material on one side of the two mentioned plies being secured to the adjacent ply by an interposed film of silicate of soda.

3. A built-up sheet of paper-board, comprising a plurality of plies of paper material, at least two of which are secured together by an interposed layer of asphaltum or its equivalent, and a ply of said paper material below said two mentioned plies being secured to the ply thereabove by an interposed film of material which when dry is in substantially granular form and serves to scour and clean the knife blades cutting through the board of the deposit of asphaltum or its equivalent thereon.

4. A built-up sheet of paper-board, comprising a plurality of plies of paper material secured together by at least two layers of asphaltum or its equivalent and at least one film of silicate of soda.

5. A built-up sheet of paper-board, comprising a plurality of plies of paper material, the ply on one exposed side of said board being secured to the adjacent inner ply by an interposed layer of asphaltum or its equivalent, and the ply on the opposite exposed side of said board being secured to the adjacent inner ply by an interposed film of silicate of soda.

6. A built-up sheet of paper-board, comprising a plurality of plies of paper material secured together by separate layers of asphaltum or its equivalent and a film of silicate of soda, the latter being the last layer of binding material through which the knife blades pass in cutting through the board.

In testimony that I claim the foregoing as my invention, I affix my signature, this 6th day of August, A. D. 1919.

FRANK B. DAVIDSON.